UNITED STATES PATENT OFFICE.

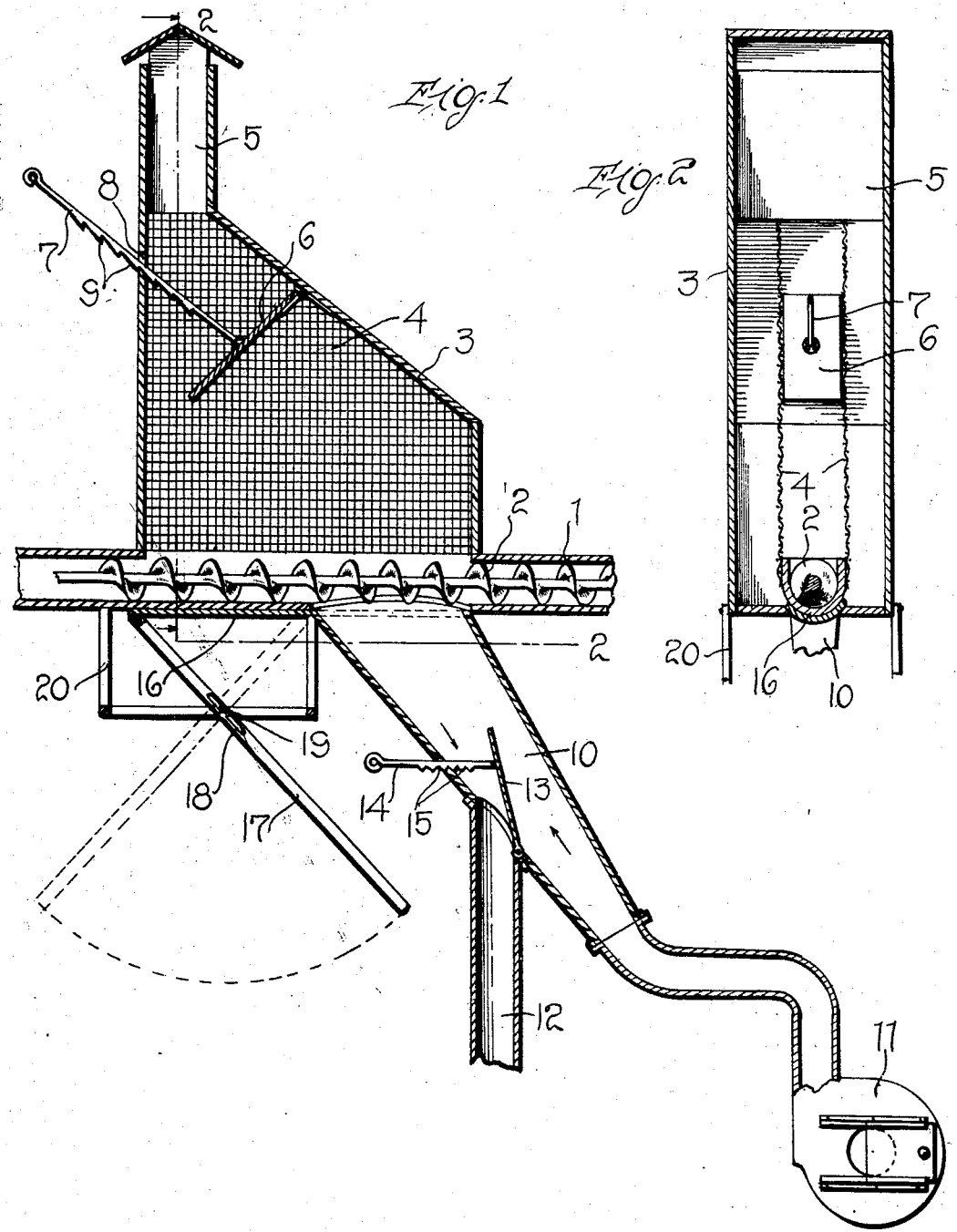

CLARENCE A. HAZEB, OF MORRILLTON, ARKANSAS.

COTTON-SEED SEPARATOR AND CLEANER.

1,098,349.   Specification of Letters Patent.   Patented May 26, 1914.

Application filed January 10, 1914. Serial No. 811,405.

*To all whom it may concern:*

Be it known that I, CLARENCE A. HAZEB, a citizen of the United States, residing at Morrillton, in the county of Conway and State of Arkansas, have invented certain new and useful Improvements in Cotton-Seed Separators and Cleaners, of which the following is a specification, reference being had to the accompanying drawings.

This invention comprehends certain new and useful improvements in cotton seed separators and has for its primary object to provide a device of this character which may be incorporated in a cotton seed conveyer tube for the purpose of separating nails and other foreign matter from the cotton seeds as they pass through the conveyer.

Another object is to provide a device of this character which will be extremely simple in construction and operation and in which will be included a separator box formed of foraminous material and through which the seeds are forced, thereby separating the same from nails and other heavy foreign matter and allowing said foreign matter to escape through a suitable discharge pipe.

A further object is to generally improve and simplify the construction and operation of devices of this character and provide the same with a cut off valve, whereby operation of the device may be dispensed with, when desired.

With the above and other objects in view, my invention consists in certain novel constructions, combinations, and arrangements of parts to be hereinafter more fully described, claimed, and illustrated in the accompanying drawings, in which—

Figure 1 is a longitudinal sectional view through my complete device; and Fig. 2 is a transverse sectional view on the line 2—2 of Fig. 1, looking in the direction indicated by the arrow.

Referring more specifically to the drawings in which similar reference characters designate corresponding parts throughout the several views, 1 designates the conveyer tube leading from the mill, not shown, to the delinter, also not shown, and having positioned therein, the conveyer screw 2.

It is a well known fact that nails and other foreign matter may be frequently found mixed with cotton seed as the latter leave the mill, and I have therefore provided my improved and novel separating means for separating the seed from the foreign matter, which separating means I will now specifically describe.

A portion of the conveyer tube above the screw 2 is open and the separator casing 3 is secured upon the conveyer tube 1 above this open upper portion. Within the casing 3 is a separator box 4 which may be formed of wire mesh or any suitable foraminous material and which has an open bottom. The casing 3 has an inclined upper wall and an exhaust flue 5 projects upwardly from the upper edge of said upper wall through which the air employed for blowing the seeds through the separator box to separate the seed from the foreign matter may escape. An adjustable deflector plate 6 is hinged at its upper end to the inner face of the upper inclined wall of the casing 3, above the upper forward corner of the separator box 4 to deflect the seed blown through said separator box and cause said seed to drop upon the forward portion of the conveyer screw 2 to be conveyed to the delinter. The deflector plate 6 may be readily adjusted to the desired angle by means of the lever 7 which is extended through the opening 8 in the forward wall of the casing 3 and has the teeth 9 formed along its longitudinal lower edge for engagement with the lower wall of the opening 8, the inner end of said lever being pivoted to the upper face of the deflector plate 6.

The portion of the conveyer tube 1 is also open beneath that portion of the conveyer screw 2 covered by said casing 3 and the air conducting tube 10 has one flared end secured to the lower portion of the conveyer tube 1 around this open portion of the same. This tube has a blower fan 11 positioned therein which serves to force air through said air conducting tube 10, through the conveyer tube 1 within which the screw is positioned, through the separator box 4 and the casing 3, and out of the latter by way of the exhaust flue 5, the air serving to force the seed from the conveyer screw through the separator box 4 and against the deflector plate 6, by means of which they are again deflected to the conveyer screw 2 to be conveyed to the delinter, the foreign matter dropping from the conveyer screw into the air conducting tube 10 and traveling downwardly in the same along the forward portion thereof, until said foreign matter reaches the discharge pipe 12, through which it is conveyed to any suitable point. It will be understood that the portion of the air conducting tube connected with the conveyer tube 1 is inclined and that the foreign matter discharge pipe 12 has one end secured in the lower wall of said air conducting tube 10.

A valve plate 13 is positioned in the air conducting tube 10 and has its lower edge hinged to said air conducting tube 10, at the lower wall of the opening within which the upper end of the foreign matter discharge pipe 12 is secured in said air conducting tube. The valve plate 13 may be readily adjusted by the lever 14 which has its inner end pivoted to said valve plate 13 and which projects through an opening in the lower inclined wall of the air conducting tube 10, said lever being provided along one longitudinal edge with the teeth 15 for engagement with one edge of the opening through which said lever extends. The valve plate 13 serves to prevent foreign matter from passing over the upper end of the foreign matter discharge pipe 12 and also serves to direct the air from the blower fan 11 to the upper inclined portion of the air conducting tube 10 and away from the foreign matter descending to the foreign matter discharge pipe 12.

When it is desired to dispense with the use of the separator, operation of the same may be prevented by simply sliding the slide valve 16 to position over the upper end of the air conducting tube 10 by means of the lever 17 which has one end connected with the forward edge of the slide valve 16 and is provided with an elongated longitudinal slot 18 through which the pivot pin 19 is positioned, said pivot pin 19 extending transversely through the bottom of the slide valve supporting casing 20 secured to the under face of the conveyer tube 1. It will also be understood that the slide valve 16 is slidably engaged against the outer face of and the bottom of the conveyer tube 1 and slides through an opening in the front wall of the air conducting tube 10, at the upper end of the latter and when in its operative position, closes the upper end of said air conducting tube 10, thereby preventing the blower fan 11 from reaching the conveyer tube 1. It will be clearly apparent that when the slide valve 16 is in its forward or inoperative position, the cotton seed will travel through the conveyer tube 1 without being forced through the separator box 4.

From the foregoing, it will be clearly apparent that I have provided a cotton seed separator which is extremely simple in construction and operation and cheap to manufacture as well as highly efficient and effective in use, and one which may be readily incorporated in a conveyer tube without changing the construction of the same.

While I have shown the preferred embodiment of my invention, it will be understood that minor changes in the details of construction and arrangement of parts may be made within the scope of the appended claims without departing from the spirit of my invention or sacrificing any of the advantages of the same.

What I claim is:—

1. A device of the class described comprising a casing, a separator box positioned in said casing, an air exhaust flue carried by said casing, a conveyer tube, an air conducting tube, said casing and separator box being positioned upon said conveyer tube, said air conducting tube being connected with the conveyer tube, said conveyer tube having communication with the separator box and the air conducting tube, means for forcing air through said air conducting tube to force materials from the conveyer tube through the separator box to separate said materials, a discharge pipe extending from the air conducting tube, a deflector plate disposed in the air conducting tube adjacent the outer edge of the mouth thereof.

2. A device of the class described comprising the combination with a conveyer tube and air conducting tube connected therewith, of a casing, a foraminous separator box positioned in said casing, said conveyer tube and air conducting tube having communication with one another, said conveyer tube and casing having communication with one another, an air exhaust flue carried by said casing, a blower positioned in said air conducting tube to force material from the conveyer tube through the separator box to separate foreign matter from said material, a deflector member within the casing for deflecting the material and causing the same to return to the conveyer tube after passing through the separator box, a discharge pipe for the foreign matter carried by the air conducting tube, means for preventing the foreign matter from reaching the blower, and means for cutting off communication between the air conducting tube and the conveyer tube.

In testimony whereof I hereunto affix my signature in the presence of two witnesses.

CLARENCE A. HAZER.

Witnesses:
J. M. COURTNEY,
O. B. WATSON.

---

Copies of this patent may be obtained for five cents each, by addressing the "Commissioner of Patents, Washington, D. C."